United States Patent [19]

Jarosek

[11] 4,445,706
[45] May 1, 1984

[54] TANDEM HITCH APPARATUS

[76] Inventor: James P. Jarosek, Rte. 1, Box 326, Waco, Tex. 76710

[21] Appl. No.: 357,197

[22] Filed: Mar. 11, 1982

[51] Int. Cl.$^3$ .................... B62D 53/00; B60D 1/00
[52] U.S. Cl. .................... 280/411 C; 172/310; 172/679; 280/472
[58] Field of Search .............. 280/411 C, 411 R, 410, 280/412, 413, 408, 472, 474, 446 R; 172/310, 311, 313, 314, 605, 657, 677, 679, 784, 787

[56] References Cited

U.S. PATENT DOCUMENTS

| | | | |
|---|---|---|---|
| 2,136,550 | 0/1938 | Howard | 280/412 |
| 3,292,948 | 12/1966 | McMasters et al. | 172/311 |
| 3,735,818 | 5/1973 | Swisher, Jr. et al. | 172/785 |
| 3,889,977 | 6/1975 | Nakawaki | 280/408 |
| 3,990,718 | 11/1976 | Holland | 280/408 |
| 4,121,852 | 0/1978 | Quanbeck | 280/411 C |
| 4,178,010 | 0/1979 | Gerber | 280/412 |
| 4,213,628 | 0/1980 | Hardesty | 280/412 |
| 4,262,921 | 0/1981 | Dwyer | 280/411 C |
| 4,344,639 | 8/1982 | Pollard | 280/411 C |
| 4,415,174 | 11/1983 | Koehn | 280/411 C |

FOREIGN PATENT DOCUMENTS

| | | | |
|---|---|---|---|
| 264027 | 7/1970 | U.S.S.R. | 280/411 C |
| 676198 | 8/1979 | U.S.S.R. | 280/411 C |

Primary Examiner—Joseph F. Peters, Jr.
Assistant Examiner—Mitchell J. Hill
Attorney, Agent, or Firm—Hubbard, Thurman, Turner & Tucker

[57] ABSTRACT

A tandem implement hitch apparatus including a longitudinally extending frame bridging over a first implement and having depending leg portions forming wheel supports and a tongue for connection to a towing vehicle. An elongated implement drawbar is pivotally mounted on the hitch frame and includes depending leg portions at opposite longitudinal ends thereof for connection to at least two spaced apart implements which may be towed by the hitch apparatus in left or right echelon working formations or an in-line tandem transport formation. The implement drawbar is positioned by a hydraulic cylinder actuator connected to the drawbar and the hitch frame.

12 Claims, 7 Drawing Figures

TANDEM HITCH APPARATUS

BACKGROUND OF THE INVENTION

1. Field of the Invention

The present invention pertains to a tandem agricultural implement hitch apparatus for towing at least two implements in a left or right echelon working formation and for towing the implements in an in-line tandem transport formation.

2. Background Art

Increases in the size and productivity of modern farms have gone hand in hand with the development of more powerful agricultural tractors with the capability of pulling larger arrangements of implements for greater ground coverage and fewer passes of the tractor over a field. However, the width of many existing gate openings and roadways, and the maximum legal width limitations for equipment transported on public roads necessarily limits the width of agricultural implements. Accordingly, there have been several efforts to develop implement hitch assemblies which are adapted for towing multiple implements in a configuration wherein the implements may be set laterally apart from each other for working the field and then brought into a generally in-line tandem arrangement for passing through gates and for transport over roadways.

Heretofore, efforts to develop suitable tandem implement hitches have resulted in fairly complex structures which are not particularly versatile and, for example, are adapted for towing two or more implements in either a left or a right echelon formation in a fixed working position of one implement with respect to the other. Reduction in the overall width of the hitch assembly has also been limited due to the configuration of some tandem hitches which do not sufficiently reduce the overall width of the vehicle assembly during road transport.

Moreover, most prior art hitch assemblies are adapted for towing two implements in one working position and are not adaptable for variations in implement width or for the type of implement being towed. Although implements such as planters are normally towed such that the implement tracks do not substantially overlap, in the application of certain other types of implements, it is desirable to have some overlap of the swath or track width of the implements. For example, in operation of implements such as disks, harrows, mowers and rakes, it is often desirable to overlap the track of the forward implement with the rearward implement to facilitate the operations being performed by the implements. It is also desirable in applications of tandem hitch arrangements to be able to form a left as well as a right echelon formation of the towed implements to facilitate working the implements on irregular shaped fields as well as sloped fields.

Accordingly, there has been a need for improvements in tandem hitch units to overcome the deficiencies of prior art apparatus, as noted herein, as well as to provide certain other improvements which are familiar to those skilled in the art. Several problems associated with prior art multiple hitch units have been overcome with a unique and relatively uncomplicated structure in accordance with the present invention.

SUMMARY OF THE INVENTION

The present invention provides an improved tandem hitch assembly for towing at least two implements behind a tractor or other towing vehicle wherein the position of the implements relative to each other and the towing vehicle may be adjusted to a selected one of a wide range of working positions as well as being arranged in a generally in-line tandem position with respect to each other for transport.

In accordance with one aspect of the present invention, there is provided a hitch apparatus including a frame adapted to be towed behind a tractor and which is adapted to extend above and rearward of a first implement and is further provided with a drawbar mechanism for connecting the first implement and a second implement to the hitch apparatus whereby the implements may be positioned in an echelon formation as well as in a direct in-line tandem formation for transport. The arrangement of the hitch frame supported by a pair of spaced apart rearwardly disposed wheels provides a clear path for moving the forwardly and rearwardly disposed implements from their working positions to their transport positions and wherein the overall width of the hitch and implement assembly is limited by the width of the implements.

In accordance with another aspect of the present invention, there is provided a hitch apparatus for towing at least two implements behind a tractor or other towing vehicle wherein the relative position of the implements may be adjusted from a maximum laterally displaced position to a towing position over a wide range of positions in accordance with the operating characteristics of the implements themselves. The working positions of the implements may be arranged in either a left or right echelon formation for working as well as clearing certain obstacles in turning operations of the hitch assembly.

In accordance with yet another aspect of the present invention, there is provided an implement hitch apparatus comprising a frame adapted for towing behind a tractor or the like and wherein said frame pivotally supports an elongated drawbar for towing at least two implements spaced apart one from the other in a variety of working positions in either a left or right echelon formation as well as in a generally in-line arrangement for reducing the transport width of the vehicle assembly. The pivotally mounted drawbar is adapted to be disposed in a selected position by a hydraulic actuator which may be controlled from the towing vehicle whereby the operator of the hitch assembly may adjust the position of the towed implements at will. The arrangement of the pivotally mounted implement drawbar is enhanced by the provision of laterally extending bearing members on the hitch apparatus frame which are cooperable with the drawbar to support loads imposed on the drawbar by the towed implements.

The hitch apparatus of the present invention also provides an improved arrangement of hydraulic lines leading to the respective implements for arrangements wherein hydraulically actuated remote control of the implements is necessary or desirable.

Those skilled in the art will recognize that the implement hitch apparatus of the present invention is a compact and structurally uncomplicated device and yet is particularly versatile in its operating characteristics and possesses a number of improvements which have been sought in the art of tandem hitch units for towing agricultural implements and the like. Those skilled in the art will also recognize other superior features and advantages of the instant invention upon reading the detailed

DESCRIPTION OF THE PREFERRED EMBODIMENT

Figure 1:
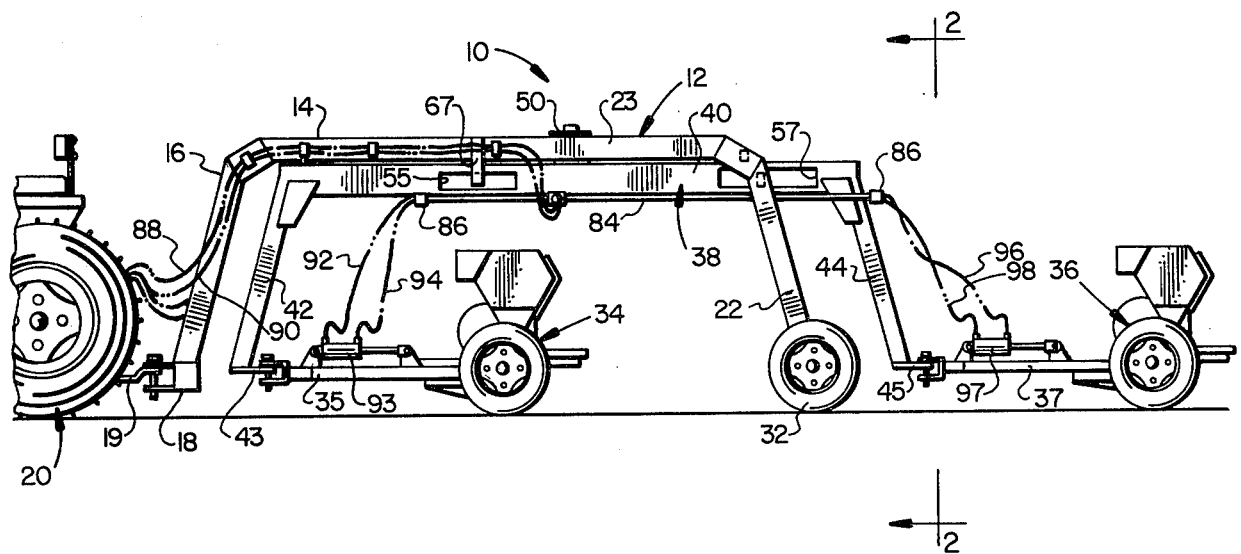
FIG. 1 is a side elevation of the tandem hitch apparatus of the present invention.

In the description which follows like parts are marked throughout the specification and drawings with the same reference numerals, respectively. The drawings are not necessarily to scale and certain detailed views may be exaggerated in scale in order to better illustrate the inventive features of the present invention.

Figure 2:
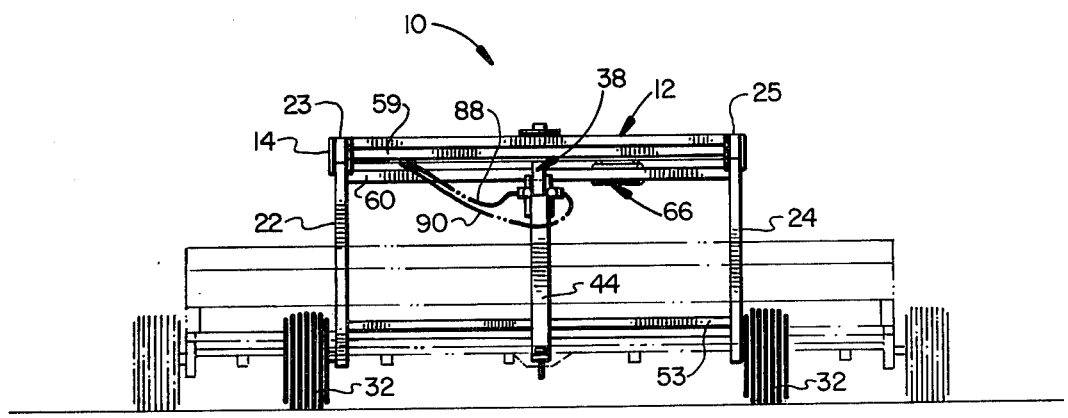
FIG. 2 is an end view taken generally from the line 2—2 of FIG. 1.
Figure 3:
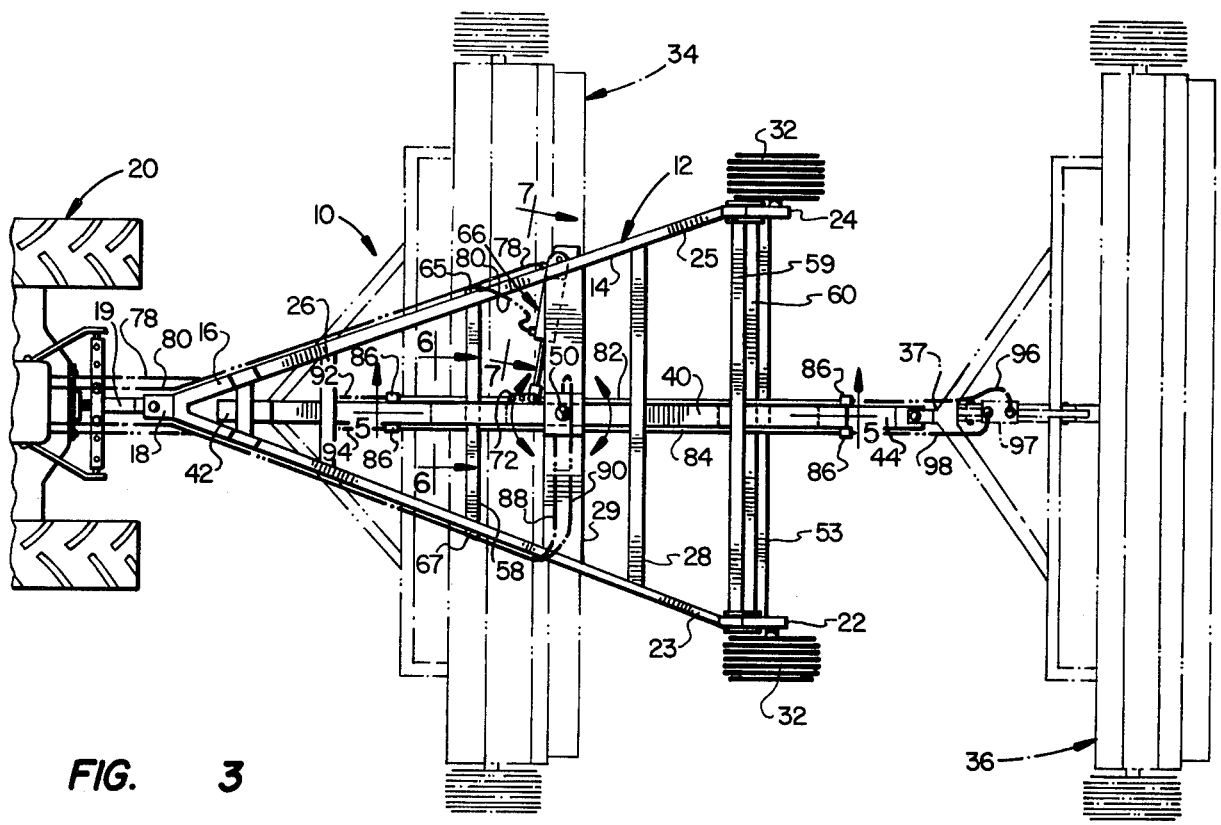
FIG. 3 is a plan view showing the implements arranged in the in-line transport.

The present invention is characterized generally as a tandem implement hitch apparatus which is adapted particularly for towing behind a vehicle such as a farm tractor or the like whereby at least two independent agricultural implements may be towed in a working formation and may be adjusted for towing in a generally in-line tandem formation for transport through gateways, along roads and bridges, and to conform with the vehicle width limitations on public roadways. Referring to FIGS. 1, 2 and 3 of the drawings, in particular, the improved hitch apparatus of the present invention is illustrated and generally designated by the numeral 10. The hitch apparatus 10 comprises an elongated main frame 12 comprising a somewhat triangular or "A" shaped frame member 14. The apex of the frame member 14 includes a generally vertically depending tongue or leg part 16 which is provided with a clevis 18 adapted to be connected to drawbar 19 or other hitch mechanism of a towing vehicle such as a conventional farm tractor or the like, generally designated by the numeral 20. The particular configuration of the connection between the frame 12 and the main towing vehicle 20 may take various forms and is not in itself a part of the present invention.

As shown in FIGS. 1, 2 and 3, the frame member 14 includes a pair of spaced apart depending legs 22 and 24 which are connected to respective longitudinal extending frame rails 23 and 25 as shown in FIGS. 2 and 3. The frame member 14 is also provided with transverse support members 26, 28, 29, 53 and 59 to provide a substantially rigid structure. The legs 22 and 24 are adapted at their lower ends to support separate axle or spindle assemblies on which are rotatably mounted respective support wheels 32 which may be of conventional agricultural type construction. The support wheels 32 may be provided with pneumatic tires and may be of conventional agricultural or construction equipment vehicle design.

Figure 5:
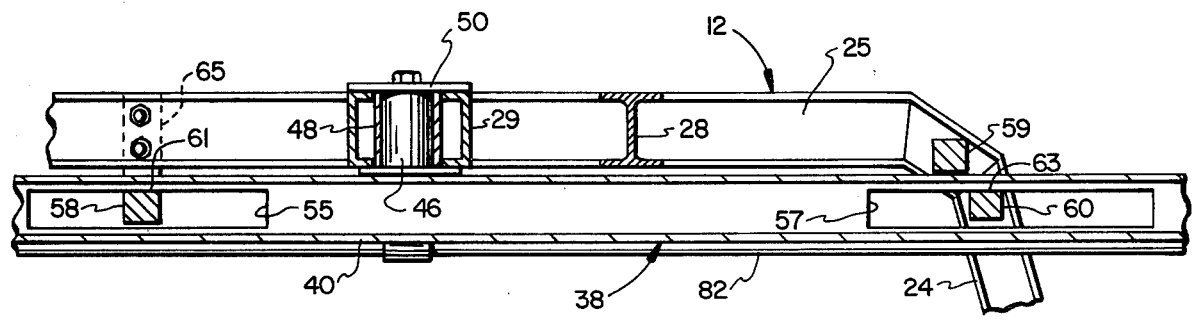
FIG. 5 is a section view taken generally along the line 5—5 of FIG. 3.

The hitch apparatus 10 is particularly adapted for towing at least two separate agricultural implements which are designated by the respective numerals 34 and 36 as indicated in FIG. 3. The implements 34 and 36 may or may not be identical and, for example, may be planters as indicated by the outlined illustrations in the drawings; however, the implements may take various forms such as, for example, tillage implements, mowers, rakes or other ground working and harvesting implements. The exemplary implements 34 and 36 are each provided with support wheels and longitudinally extending tongue portions 35 and 37, respectively. The implements 34 and 36 are both connected to an elongated implement drawbar, generally designated by the numeral 38. The drawbar 38 includes an elongated generally horizontally extending beam 40 having downwardly depending leg parts 42 and 44 at opposite ends thereof. The drawbar 38 is pivotally mounted on the frame member 14 at substantially the midpoint of the beam member 40 by suitable arrangement such as a generally vertically extending trunnion portion 46, as shown in FIG. 5. The trunnion 46 is journalled in a bearing sleeve 48 forming a part of the laterally extending frame member 29. The trunnion 46 is provided with a bearing retainer cap 50, as illustrated in FIG. 5. Those skilled in the art will appreciate that a specific arrangement of the pivotal connection of the drawbar beam member 40 to the frame member 14 may take various forms and a preferred exemplary embodiment is illustrated herein. Referring briefly to FIG. 1, the depending leg portions 42 and 44 of the drawbar 38 are provided with respective generally horizontal extending bracket portions 43 and 45 which are adapted to serve as hitch points for the respective implements 34 and 36.

Figure 6:
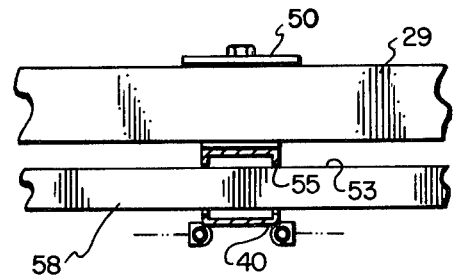
FIG. 6 is a detail section view taken generally along the line 6—6 of FIG. 3.

Referring now to FIGS. 3, 5 and 6, in particular, the drawbar beam member 40 is provided with longitudinally extending recess portions 55 and 57 through which extend generally laterally disposed bearing support members 58 and 60 which form additional lateral support members of the main frame 12. The member 58 is provided with an upward facing bearing surface 61 for engagement with the beam 40 to minimize vertical deflection thereof and reduce loading on the pivot bearing arrangement provided by the cooperating trunnion 46 and journal bearing 48. In like manner, the member 60 is engageable with the beam member 40 along an upward facing bearing surface 63. The transverse bearing support members 58, 59 and 60 may be formed as rectangular cross-sectional bar or tubing members or back-to-back structural channel members, for example. The beam member 40 and/or the bearing support members 58 and 60 may also be provided with suitable replaceable flat bearing pads or the like, not shown, as required to provide adequate bearing surfaces. The member 58 is adapted to be connected to the frame member 14 by suitable bracket portions 65 and 67 which may be bolted to the frame member or the member 58 with conventional threaded fasteners, not shown. In like manner, the member 60 is preferably removably secured to the frame 12 to facilitate assembly and disassembly of the drawbar 38 with respect to the frame.

Figure 7:
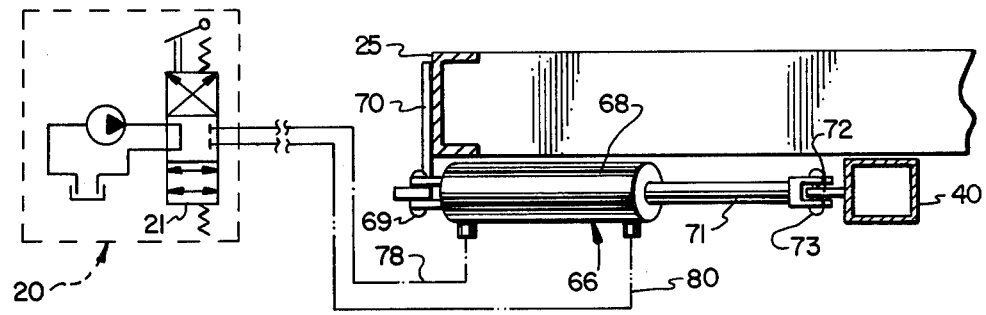
FIG. 7 is a detail view taken generally along line 7—7 of FIG. 3.

The drawbar 38 is adapted to be pivoted about the axis of the trunnion portion 46 by actuator means comprising a double acting hydraulic cylinder piston type actuator, generally designated by the numeral 66. As shown in FIGS. 3 and 7, the actuator 66 includes a cylinder portion 68 which has a mounting clevis 69 formed on one end and which is adapted to be supported by a bracket 70 secured to the frame member 25. The piston rod 71 of the actuator 66 is connected at its distal end to a bracket part 72 formed on one side of the drawbar beam 40. The piston rod 71 is provided with a suitable clevis portion 73 which may be connected to the bracket portion 72 in a selected one of a plurality of positions in accordance with spaced apart holes formed on the bracket portion 72 as shown in FIG. 3.

Figure 4:
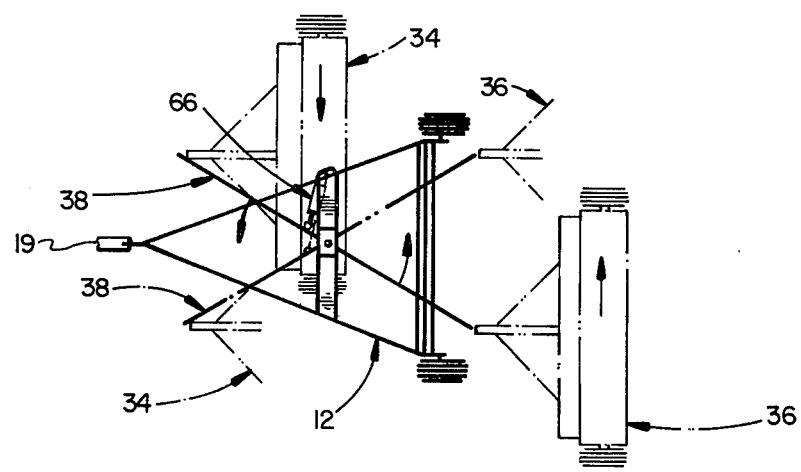
FIG. 4 is a plan view in somewhat schematic form showing the limit positions of the implements in either a left or right echelon formation.

The actuator 66 is preferably configured to have a working stroke length sufficient to pivot the drawbar 38 from one somewhat laterally extending limit position forming a right echelon formation as indicated in FIG. 3, to the other laterally extending limit position to form a left echelon formation of the implements as also indicated in FIG. 4. The actuator 66 is adapted to be supplied with hydraulic fluid by way of supply and return hoses 78 and 80 which are suitably trained along the side of the frame member 25 and lead from the hydraulic system of the tractor 20. By actuating a suitable control valve 21, shown schematically in FIG. 7, and which is preferably located at the driver's control station on the tractor 20, the operator may cause the actuator 66 to extend or retract the piston rod 71 to selectively position the drawbar 38 in any one position between and including the limit positions illustrated in FIG. 4 and also, of course, the in-line tandem position indicated in FIG. 3. Accordingly, the implements 34 and 36 may be arranged generally in-line with each other for transport operations and, upon commencing the working of a field, the drawbar 38 may be swung into a selected laterally extending position to effect an echelon formation of the implements 34 and 36 to extend the width of ground coverage which may be obtained in one pass of the tractor and hitch assembly across a field.

In the operation of the hitch apparatus 10 with implements such as planters, the drawbar 38 is normally positioned such that there is minimal overlap of the track of the two implements and the formation of the implements may be either a left or right echelon in accordance with, for example, the direction of turning of the tractor at the ends of the passes across the field. However, if implements such as mowers, rakes or certain tillage implements are being towed, it may be desired to position the drawbar 38 such that there is substantial overlap of the track of the implements to improve the work process. Accordingly, by providing for substantially infinite positioning of the implements in formation with respect to each other, improved ground coverage and operational characteristics may be obtained and this may be continually monitored and changed by the tractor operator at will. Moreover, depending on the contour of the ground being worked and the shape of the field, it may be to the operator's advantage to swing the implements into a left or right working formation and this adjustment may normally be done without disconnecting the piston rod of the cylinder 66 from its connection to the drawbar. However, this would depend on the maximum stroke length of the cylinder actuator.

Those skilled in the art will appreciate that other actuator arrangements may be adapted for use in connection with the hitch apparatus 10. For example, a rotary hydraulic actuator may be adapted for connection to the trunnion 46 through suitable coupling means including, if necessary, a gear or chain drive arrangement. However, the use of a double acting hydraulic cylinder with suitable valving provides a substantially rigid and load transmitting coupling for positioning the drawbar in any selected position within the normal working range of the hitch apparatus 10.

By provision of a hitch apparatus having a main frame 12 which is disposed over and extends rearwardly of the forward implement, positioning of the forward implement is enhanced. Moreover, the overall width of the hitch assembly, including the implements, in the transport configuration is limited only by the width of the implements themselves and not by the hitch structure.

Depending on the type of implement being towed by the hitch apparatus 10, it is often necessary to provide remote control of certain functions of the implement itself. In this regard, the hitch apparatus is provided with an improved arrangement for connecting hydraulic hoses from the implements to the hydraulic power supply on board the tractor itself. The arrangement of the drawbar 38 which is pivotal about an axis with respect to the main frame 12, provides for an arrangement whereby hydraulic conduits may be trained along the drawbar and suitably mounted thereon. For example, as shown in FIGS. 1, 2 and 3, the drawbar 38 is preferably provided with elongated hydraulic fluid supply conduits 82 and 84 which are trained along the bottom side of the beam member 40 as shown. The conduits 82 and 84 are preferably provided with quick disconnect type couplings 86 at their respective opposite ends and which may be of conventional design. Hydraulic fluid is supplied to the conduits 82 and 84 by suitable hoses 88 and 90 leading from the tractor 20 and trained along the tongue portion 16 and the frame member 23 to a point generally adjacent the pivot axis of the drawbar 38. The hoses 88 and 90 lead to respective coupling portions of the conduits 82 and 84 which are disposed generally adjacent to the pivot axis of the drawbar 38. Accordingly, the drawbar may be pivoted throughout its working range without the need to provide substantial free hose length to accommodate the travel of the drawbar and the implements connected thereto. By providing the conduits 82 and 84 on the drawbar 40, hoses 92 and 94 leading to the implement 34 and hoses 96 and 98 leading to the implement 36 may be connected to the couplings 86 at each end of the respective conduits. This arrangement greatly simplifies and improves the routing of hydraulic lines from the tractor 20 to the respective implements.

The hitch apparatus 10 may be constructed of conventional engineering metals including standard structural steel components such as channels, angles, rectangular tube or cylindrical tube shapes.

Those skilled in the art will recognize that various substitutions and modifications may be made to the preferred embodiment of the hitch assembly of the present invention without departing from the scope and spirit of the invention as recited in the appended claims.

What I claim is:

1. A hitch apparatus for towing first and second implements spaced apart behind a towing vehicle in a laterally spaced echelon working formation and in a generally in-line tandem transport formation, said apparatus comprising:

an elongated frame including a tongue part at one end of said frame for connecting said apparatus to said towing vehicle, and ground engaging support wheel means disposed at the opposite end of said frame, said frame being normally supported generally above and bridging over said first implement and with said support wheel means being disposed between said first and second implements;

implement drawbar means comprising an elongated beam pivotally connected to said frame by pivot means on said beam between opposite ends of said beam, said beam including a pair of spaced apart hitch points on opposite sides of said pivot means for connecting said first implement and said second implement to said drawbar means, respectively, for towing said implements by said drawbar means;

actuator means connected to said drawbar means and said frame for pivotally moving said drawbar means to move said first and second implements between respective laterally spaced positions in said working formation and substantially in-line tandem positions in said transport formation; and bearing support means on said frame and engageable with said beam at a point spaced from said pivot means for supporting said beam against deflection due to towing forces exerted on said implements.

2. The apparatus set forth in claim 1 together with:
actuator means interconnecting said drawbar means and said frame and operable to move said drawbar means between said working position of said implements and said transport position.

3. The apparatus set forth in claim 2 wherein:
said actuator means comprises a hydraulic cylinder and piston actuator interconnecting said drawbar means and said frame, and said apparatus includes a hydraulic circuit for conducting hydraulic fluid to and from said actuator for operating said actuator to move said drawbar means to said working position and said transport position.

4. The apparatus set forth in claim 2 wherein:
said actuator means is operable to move said drawbar means between a left echelon formation, a right echelon formation and said transport formation of said implements.

5. A hitch apparatus for towing at least two implements behind a towing vehicle in a laterally spaced echelon working formation and in a generally in-line tandem transport formation, said apparatus comprising:

an elongated frame including a tongue part at one end of said frame for connecting said apparatus to said towing vehicle, and ground engaging support wheel means disposed at the opposite end of said frame, said frame being normally supported generally above and bridging over a first implement when connected to said towing vehicle;

implement drawbar means comprising an elongated beam pivotally supported on said frame by pivot means between opposite ends of said beam, a pair of spaced apart hitch points disposed on respective depending leg portions of said drawbar means on opposite sides of said pivot means and at opposite ends of said beam for connecting said first implement and a second implement to said drawbar means;

bearing support means disposed on said frame at a point spaced from said pivot means for engaging said beam to support said drawbar against deflection due to towing forces exerted on said implements; and actuator means interconnecting said drawbar means and said frame and operable to move said drawbar means with respect to said frame for moving said first and second implements between respective laterally spaced positions in a left echelon working formation and a right echelon working formation, and a substantially in-line tandem position in said transport formation of said implements.

6. A hitch apparatus for towing at least two implements behind a towing vehicle in a laterally spaced echelon working formation and in a generally in-line tandem transport formation, said apparatus comprising:

an elongated frame including a tongue part at one end for connecting said apparatus to said towing vehicle, and ground engaging support wheel means disposed at the opposite end of said frame, said frame being normally supported generally above and bridging over a first implement;

implement drawbar means comprising an elongated beam pivotally supported on said frame by pivot means interposed between a pair of spaced apart hitch points on said drawbar means, said hitch points being disposed on respective depending leg portions of said drawbar means at opposite ends of said beam for connecting said first implement and a second implement to said drawbar means for towing said implements by said drawbar means, and bearing support means on said frame and engaged with said drawbar means at a point spaced from said pivot means to reduce deflection of said drawbar means due to towing forces exerted on said implements; and said drawbar means being movable with respect to said frame for moving said first and second implements between respective laterally spaced positions in said working formation and substantially in-line tandem positions in said transport formation.

7. The apparatus set forth in claim 5 or 6 wherein:
said bearing support means comprises at least two generally laterally extending members of said frame spaced apart one from the other on opposite sides of said pivot means and including bearing surface means engageable with said beam.

8. The apparatus set forth in claim 7 wherein:
said beam includes respective elongated openings formed spaced apart in said beam, and said laterally extending members project through said openings, respectively.

9. A hitch apparatus for towing at least two agricultural implements behind a tractor in a laterally spaced echelon working formation and in a generally in-line tandem transport formation, said apparatus comprising:

an elongated frame including a generally vertically depending tongue part at one end and including means for connecting said apparatus to said towing vehicle and ground engaging support wheel means at the opposite end of said frame, said frame being supported generally above and bridging over a first implement;

an elongated implement drawbar including pivot means thereon between opposite ends of said drawbar, said drawbar being pivotally connected to said frame and including a pair of spaced apart hitch points, respectively, for towing said implements, bearing means on said frame and spaced from said pivot means, said bearing means being engageable with said drawbar to support said drawbar against deflection due to towing forces exerted on said implements, said drawbar being movable with respect to said frame for moving said first and second implements between respective laterally spaced positions in a left or right echelon working formation and a substantially in-line tandem position in said transport formation;

a hydraulic actuator interconnecting said drawbar and said frame for moving said drawbar between said formations; and a hydraulic fluid circuit including conduit means interconnecting said actuator and said tractor and valve means for conducting hydraulic fluid to said actuator for moving said drawbar to position said implements in a selected working position or said transport position at will.

10. A hitch apparatus for towing at least two implements behind a towing vehicle in a laterally spaced echelon working formation and in a generally in-line tandem transport formation, said apparatus comprising:

an elongated frame comprising a generally triangular shaped frame member extending generally horizontally over a first implement, a tongue part depending substantially vertically from a forward end of said frame member for connecting said apparatus to said towing vehicle, a pair of spaced apart generally vertically depending legs connected to opposed ends of said frame member at the end of said frame opposite said tongue part, and ground engaging support wheels connected to said legs for supporting said frame normally generally above and bridging over said first implement and between said first implement and a second implement connected to implement drawbar means connected to said frame;

said drawbar means being pivotally supported on said frame by pivot means and including a pair of spaced apart hitch points for connecting said first implement and said second implement to said drawbar means for towing said implements by said drawbar means, respectively, said drawbar means being movable with respect to said frame for moving said first and second implements between respective laterally spaced positions in said working formation and substantially in-line tandem positions in said transport formation; and bearing means on said frame and engaged with said drawbar means at a point spaced from said pivot means for supporting said drawbar means against deflection in due to towing forces exerted on said implement.

11. A hitch apparatus for towing at least two implements behind a towing vehicle in a laterally spaced echelon working formation and in a generally in-line tandem transport formation, said apparatus comprising:

an elongated frame including a tongue part at one end of said frame for connecting said apparatus to said towing vehicle, and ground engaging support wheel means disposed at the opposite end of said frame, said frame being normally supported generally above and bridging over a first implement;

implement drawbar means comprising an elongated beam pivotally supported on said frame by pivot means interposed between a pair of spaced apart hitch points disposed on respective depending leg portions of said drawbar means at opposite ends of said beam for connecting a first implement and a second implement to said drawbar means, respectively;

actuator means interconnecting said drawbar means and said frame and operable to move said drawbar means with respect to said frame for moving said first and second implements between respective laterally spaced positions said working formation, and substantially in-line tandem positions in said transport formation; and pressure fluid conduits extending longitudinally along said beam toward said respective depending leg portions of said drawbar means, and flexible pressure fluid hoses connected to said conduits and supported by said frame, said hoses being in communication with a source of pressure fluid on said towing vehicle for conducting pressure fluid to said conduits and to means on at least one of said implements, said means on at least one of said implements including fluid conduit means connected to said conduits on said beam.

12. The apparatus set forth in claim 11 wherein:
said hoses are connected to said conduits near said pivot means.

* * * * *